CLASSIFICATION
9846-4
DIVISION.
9846X
Patented 1 July 1836
W. SWEETZER
Traveling Trunk 7-1-1836
a. covering of the platt
b. covering of leather
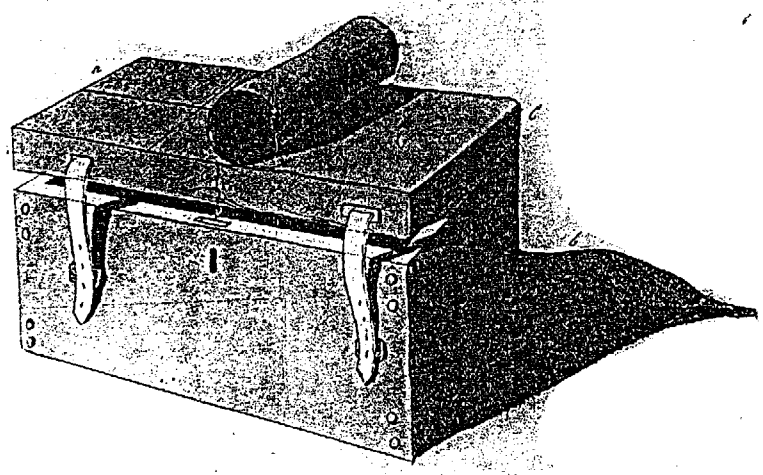
O/P
Strickland Del
Patent Office Sept. 30th 1843
Made under the direction of the Commissioner of Patents in conformity with act of 5th March 1837

July 1. 1836. [illegible]

9846X

Washington Sweetzer of Portsmouth New Hampshire

Letters Patent

The schedule referred to in these Letters Patent and making
part of the same, containing a description in the words of
the said Washington Sweetzer himself of his improvement
in the Traveling Trunks –
To all to whom these presents shall come.
Be it known that I Washington Sweetzer of Portsmouth
County of Rockingham and State of New Hampshire, have inven
-ted a new and useful improvement in the Traveling Trunks
and that the following is a full and exact description
thereof — My improvement consists in covering the
outside of the trunk with some metallic substance, Tin plate
we have used as being the cheapest article. The trunk
[illegible] is completely covered with the sheet metal externally
before the leather or hides are drawn on, the trunk is
then covered with leather or skins and finished in the
usual manner. What I claim as my invention or
improvement is the covering the trunk for traveling and
other purposes, with tin plate, or some metalic substances and
making it more safe and secure against fire from the
burning of baggage cars on rail roads &c. it is also a
safety in stormy weather against wet, not being liable to
get to the inside of the trunk, and another advantage
is it cannot be cut or injured as trunks in general are
liable to — The said trunk in addition to its being
made impervious to water &c. is externally surrounded
or secured by iron, which renders it also unsurpassed
for strength.

Witnesses Stephen Pullen — Washington Sweetzer
[illegible] T. [illegible]
[illegible]